(12) United States Patent
Grochowski

(10) Patent No.: US 6,848,354 B2
(45) Date of Patent: Feb. 1, 2005

(54) UNITARY ROD/PISTON ASSEMBLY

(76) Inventor: Gary L. Grochowski, 727 Kiser St., Dayton, OH (US) 45404

( * ) Notice: Subject to any disclaimer, the term of this patent is extended or adjusted under 35 U.S.C. 154(b) by 24 days.

(21) Appl. No.: 10/238,462

(22) Filed: Sep. 10, 2002

(65) Prior Publication Data

US 2003/0146579 A1 Aug. 7, 2003

Related U.S. Application Data

(60) Provisional application No. 60/355,039, filed on Feb. 7, 2002.

(51) Int. Cl.[7] .................................................. F16J 9/00
(52) U.S. Cl. ........................................................ 92/249
(58) Field of Search .......................... 92/248, 249, 250; 277/437

(56) References Cited

U.S. PATENT DOCUMENTS

| | | |
|---|---|---|
| 3,961,868 A | 6/1976 | Droege, Sr. et al. |
| 3,961,869 A | 6/1976 | Droege, Sr. et al. |
| 4,061,443 A | 12/1977 | Black et al. |
| 4,177,712 A | 12/1979 | Herzig |
| 4,432,925 A | 2/1984 | Holtzberg et al. |
| 4,462,767 A | 7/1984 | Dorsch |
| 4,653,986 A | 3/1987 | Ashton |
| 4,986,553 A | 1/1991 | Preston et al. |
| 5,022,313 A | 6/1991 | Shontz et al. |
| 5,092,224 A | 3/1992 | Rozek |
| 5,213,025 A * | 5/1993 | Rozek .......................... 92/248 |
| 5,282,412 A | 2/1994 | Ebbing |
| 5,284,084 A * | 2/1994 | Pippert et al. ................. 92/241 |
| 5,611,260 A | 3/1997 | Kanari et al. |
| 5,615,756 A | 4/1997 | Grundei et al. |
| 5,615,894 A | 4/1997 | vom Schemm |
| 5,756,025 A | 5/1998 | Heine et al. |
| 5,874,170 A | 2/1999 | Heine et al. |
| 5,975,360 A | 11/1999 | Ophardt |
| 6,003,227 A | 12/1999 | Deppert et al. |
| 6,139,023 A | 10/2000 | Heine et al. |
| 6,171,083 B1 | 1/2001 | Schuller |
| 6,200,109 B1 | 3/2001 | Dinkel et al. |
| 6,490,964 B2 * | 12/2002 | Buynacek ..................... 92/248 |

FOREIGN PATENT DOCUMENTS

| | | |
|---|---|---|
| DE | 44 10 996 C1 | 6/1995 |
| EP | 0 383 029 A2 | 8/1990 |

* cited by examiner

Primary Examiner—F. Daniel Lopez
(74) Attorney, Agent, or Firm—R. William Grahan (57) ABSTRACT

Preferred rod/piston assemblies (50, 50', 150) comprise unitary rod members (52, 52', 152) and compression rings (54, 54', 154). In accordance with one preferred embodiment (50), the unitary rod member (52) comprises a connecting rod portion (60), a lower bezel portion (62) and a knob portion (66). The lower bezel portion (62) and the compression ring (54) define facing surfaces (82, 106) along which the compression ring (54) is secured to the unitary rod member (52). In accordance with a preferred method of manufacture, one or both of the facing surfaces (82, 106) are chemically treated to promote coupling of the compression (54) ring to the lower bezel portion (62). The unitary rod member (52) and the compression ring (54) are positioned in the mold or press with the compression ring (54) fitted over the knob portion (66) of the unitary rod member. Elevated temperature and pressure are applied to secure the compression ring (54) to the lower bezel portion (62). Among the advantages of the preferred structure are minimization the number of parts which must be supplied to form the preferred rod/piston assemblies (50, 50', 150) and simplification of the processes for their construction.

13 Claims, 11 Drawing Sheets

```
POSITIONING THE UNITARY ROD
MEMBER AND THE COMPRESSION RING
IN A CAVITY OF A MOLD WITH THE
COMPRESSION RING FITTED OVER THE      ~200
KNOB PORTION OF THE UNITARY ROD
MEMBER
```

```
INJECTING RESIN INTO THE CAVITY OF
THE MOLD AND SOLIDIFYING THE RESIN
TO FORM A POLYMERIC FILLER TO         ~202
SECURE THE COMPRESSION RING TO
THE UNITARY ROD MEMBER
```

UNITARY ROD/PISTON ASSEMBLY

FIELD OF THE INVENTION

The present invention relates generally to rod/piston assemblies of a type capable of use in non-commercial air compressors and, more particularly, to rod/piston assemblies comprising unitary rod members and to a method for affixing compression rings to such bodies.

BACKGROUND OF THE INVENTION

One type of conventional oil-free rod/piston assembly comprises an aluminum rod die casting, a preformed polytetrafluoroethylene ["PTFE"] compression ring, an aluminum die cast retaining ring and a metal retaining screw or rivet. The aluminum rod die casting includes a crank bore and a lower bezel connected by an I-section rod. When assembled, the PTFE compression ring is clamped between the retaining ring and the lower bezel to form a piston head. Similar structures are proposed in Droege et al. U.S. Pat. No. 3,961,869 and Droege et al U.S. Pat. No. 3,961,868.

Typically, the rod/piston assembly is fitted into a cylinder such that reciprocation of the piston draws air into the cylinder through an intake port and expels the air from the cylinder through an outlet port under pressure. The compression ring presses against the inner surface of the cylinder to provide a pressure-tight seal about the piston head. Conventional PTFE compression rings comprise annuli sufficiently thin to flex against the inner surfaces of the cylinder so as to enhance the seal between the rod/piston structure and the cylinder.

The use of flexible PTFE in forming compression rings has numerous advantages, including high strength and low friction against the inner surface of the cylinder. Nevertheless, cast or sintered PTFE generally is too stiff and brittle to flex in the manner of the compression ring described above without further processing steps, such as stretching. One desirable feature of the prior art rod/piston assembly is that the PTFE ring can be cast or sintered and then processed before it is combined with the aluminum rod die casting to form the assembly.

One drawback to the prior art rod/piston structure is the relatively large number of pre-formed or pre-cast parts which go into its assembly. The number of pre-formed or pre-cast parts required to assemble the finished structure increases the cost of manufacturing the structure. Likewise, separately fitting the compression ring over the lower bezel of the aluminum rod die casting; fitting the retaining ring over the lower bezel; and fastening the retaining ring to the lower bezel with the retaining screw or rivet adds to the time and cost of assembling the structure.

The number and arrangement of the parts also affects the dimensional repeatability of the structure. That is, the overall length of the rod/piston assembly depends on several factors, including cumulative variations in the lengths of the aluminum rod die casting, the PTFE compression ring and the retaining ring; the elasticity of the compression ring; and the torque or force used in tightening the retaining screw or rivet to clamp the parts together. Controlling all of these factors would be difficult and any steps taken to do so would increase further the cost of the finished assembly.

Dinkel et al. U.S. Pat. No. 6,200,109 proposes an electric motor/pump assembly including a motor shaft and a sealing element which acts upon the motor shaft radially. The sealing element is made of an elastic material, for example, silicone plastics, which is injected into a groove to seal a gap where the sealing lip of the sealing element abuts on the motor shaft side.

Heine et al. U.S. Pat. Nos. 6,139,023; 5,874,170; and 5,756,025, the disclosures of which are incorporated by reference, propose a method for injection molding a seal carrier to a sealing member. The sealing member is modified by admixture or surface treatment with a material compatible with the seal carrier. The modified sealing member then is placed in an injection mold. The mold is closed and plastic material which will form the carrier body is injected into the mold. The sealing member fuses to the plastics of the carrier body as the carrier body cools, thereby providing a durable connection in substance lock.

Ebbing U.S. Pat. No. 5,282,412 proposes an angulating piston assembly for a vehicle air conditioning system compressor. The proposed angulating piston assembly is made up of two components: namely, a composite piston and a piston ring subassembly that includes a rigid annular support collar and a stretched piston ring on the collar. A proposed method for making the angulating piston assembly includes the steps of cutting or skiving an elastomeric ring if desired width from an extruded tube of mineral or graphite filled PTFE, stretching the elastomeric ring, sliding the elastomeric ring onto the support collar to form the piston ring subassembly; placing the piston ring subassembly into one half of a mold cavity for forming the molded head of the composite piston; positioning a distal end of a piston rod so as to extend into the same half of the mold cavity; closing the other half of the mold cavity to fully capture the piston ring and the subassembly; and injecting high temperature, high strength glass-reinforced resin into the cavity in order to form the piston head.

Preston et al. U.S. Pat. No. 4,986,553 proposes a shaft seal comprising a rigid case ring and a PTFE sealing ring component which is secured to a radial flange of the case ring by being bonded to a molded elastomeric sealing ring component.

Various patents, including Kanari et al. U.S. Pat. No. 5,611,260; Holtzberg U.S. Pat. No. 4,432,925; and Dorsch U.S. Pat. No. 4,462,767, propose mechanical techniques for securing PTFE rings to piston heads.

Thus, there remains a need in the art for an improved rod/piston assembly comprising relatively few pre-formed or pre-cast parts and an improved method for manufacturing such an assembly requiring relatively few production steps. In particular, there is a need in the art for an improved method which is particularly, though not exclusively, suited for use in manufacturing rod/piston assemblies comprising pre-formed PTFE compression rings and pre-formed or pre-cast metal rod members having repeatable dimensions.

SUMMARY OF THE INVENTION

These needs and others are addressed by a rod/piston assembly comprising a unitary rod member and a compression ring. The preferred unitary rod member is composed of a rigid material, most preferably a metal such as aluminum or an aluminum alloy. The preferred compression ring is composed of flexible PTFE.

The preferred unitary rod member includes a lower bezel portion, a connecting rod portion and a knob portion. The preferred lower bezel portion defines first and second sides. The preferred connecting rod portion terminates along the first side of the lower bezel portion. The preferred knob portion extends from the second side of the lower bezel portion. Most preferably, the knob portion has an outer diameter less than an outer diameter of the lower bezel portion so as to define a shoulder or flange along the second side of the lower bezel portion. The preferred knob portion defines opposed inner and outer sides and a peripheral surface connecting the inner and outer sides. The inner side of the preferred knob portion coincides with the second surface of the lower bezel portion.

The preferred compression ring defines a hole fitting about the knob portion of the unitary rod member. Most preferably, the compression ring comprises a thin annulus having an outer diameter greater than the outer diameter the lower bezel portion.

In accordance with a first especially preferred embodiment, the outer side of the knob portion defines a free or exposed surface. The compression ring defines a securing surface facing the second surface of the lower bezel portion of the unitary rod member. The compression ring is secured to the unitary rod member along the second surface of the lower bezel portion such that a peripheral portion of the compression ring extends radially beyond the lower bezel portion for contact with an inner surface of a cylinder. Optionally, a plastic filler ring or collar is secured around the peripheral surface of the knob portion to promote engagement between the peripheral portion of the compression ring and an inner surface of a cylinder when the rod/piston assembly is in use, and to control the cylinder volume.

In accordance with a first preferred method of manufacture, the compression ring is secured to the unitary rod member by means of a combination of elevated temperature and pressure in a mold or press. In accordance with this method, the second surface of the lower bezel portion, the securing surface of the compression ring, or both, are chemically treated, and a bonding agent is applied, to promote coupling of the compression ring to the lower bezel portion. The unitary rod member and the compression ring are positioned in the mold or press with the compression ring and, optionally, the plastic filler ring, fitted over the knob portion of the unitary rod member. Elevated temperature and pressure are applied to secure the compression ring and, optionally, the plastic filler ring, to the lower bezel portion.

In accordance with one preferred option, the unitary rod member and the compression ring are placed in a mold having a recess adjacent the knob portion of the unitary rod member and the compression ring. Resin is injected into the recess and solidified to form the plastic filler ring or collar.

In accordance with a second especially preferred embodiment, a preformed plastic filler ring or collar is positioned over the knob portion of the unitary rod member before the compression ring is secured to the unitary rod member. This preferred plastic filler ring includes an inner bead or lip which cooperates to secure the plastic filler ring to the peripheral surface of the knob portion.

Thus, in accordance with a second especially preferred method of manufacture, the compression ring and the plastic filler ring are secured to the unitary rod member by means of a combination of elevated temperature and pressure in a mold or press. More specifically, the lower bezel portion of the unitary rod member, the compression ring and the plastic filler ring, or a combination of those parts, are chemically treated and at least partially coated with a bonding agent. The unitary rod member, the compression ring and the plastic filler ring are positioned in the mold or press with the compression ring and the plastic filler ring fitted over the knob portion. Elevated temperature and pressure are applied in the mold or press to secure the compression ring and the plastic filler ring to the unitary rod member.

In accordance with a third especially preferred embodiment, the unitary rod member further includes an upper bezel portion extending from the outer side of the knob portion toward a free or exposed surface of the upper bezel portion. The preferred upper bezel portion has an outer diameter greater than that of the outer diameter of the knob portion such that the lower bezel portion, the knob portion and the upper bezel portion cooperate to define a peripheral channel between the upper and lower bezel portions. Most preferably, the hole through the compression ring has an inner diameter at least as large as the outer diameter of the upper bezel portion so as to permit the compression ring to slide over the upper bezel portion during assembly.

In accordance with a third preferred method of manufacture, the compression ring is secured to the unitary rod member by means of a polymeric filler or bonding agent, which is injected into the peripheral channel defined in the unitary rod member while the unitary rod member and the compression ring are seated in a mold or press. In accordance with this method, the unitary rod member and the compression ring are positioned in the mold or press with the compression ring fitted over the knob portion of the unitary rod member. Resin is injected into the mold or press and solidified to form the polymeric filler.

Thus, the preferred structures minimize the number of parts which must be supplied to form a rod/piston assembly and simplify the processes for their construction. The preferred rod/piston assemblies each comprise no more than three parts: the unitary rod member, the compression ring and, optionally, the preformed plastic filler ring or collar. Each of the preferred rod/piston assemblies is susceptible of assembly by means of a relatively simple pressing or injection molding process. No rivets or threaded fasteners are required to retain the compression rings on the unitary rod members.

Furthermore, the preferred structures are adapted for a high level of dimensional repeatability. In each of the preferred rod/piston assemblies, the unitary rod assembly defines a free or exposed surface extending beyond the region where the compression ring is secured to the unitary rod member. Consequently, the overall length of the rod/piston assembly depends solely on the length of the unitary rod member. Since the length of the unitary rod member is the primary factor affecting the overall length of the assembly, the repeatability of the overall length is promoted.

Furthermore, it is believed the unitary rod member will be susceptible of casting in a die of relatively simple construction. This will allow an increase in the number of cavities which can be formed in such a die, therefor reducing the cost of parts for the rod/piston assembly.

Therefore, it is an object of the invention to provide an improved rod/piston assembly requiring a relatively small number of parts. It is a further object of the invention to provide a relatively simple method for manufacturing the assembly. The invention will be further described in conjunction with the appended drawings and the following detailed description.

BRIEF DESCRIPTION OF THE DRAWINGS

FIG. 9 is a schematic view, showing the rod/piston assembly of FIG. 2 positioned in a cylinder of an air compressor or the like;

DETAILED DESCRIPTION OF THE PREFERRED EMBODIMENT

Figure 1:
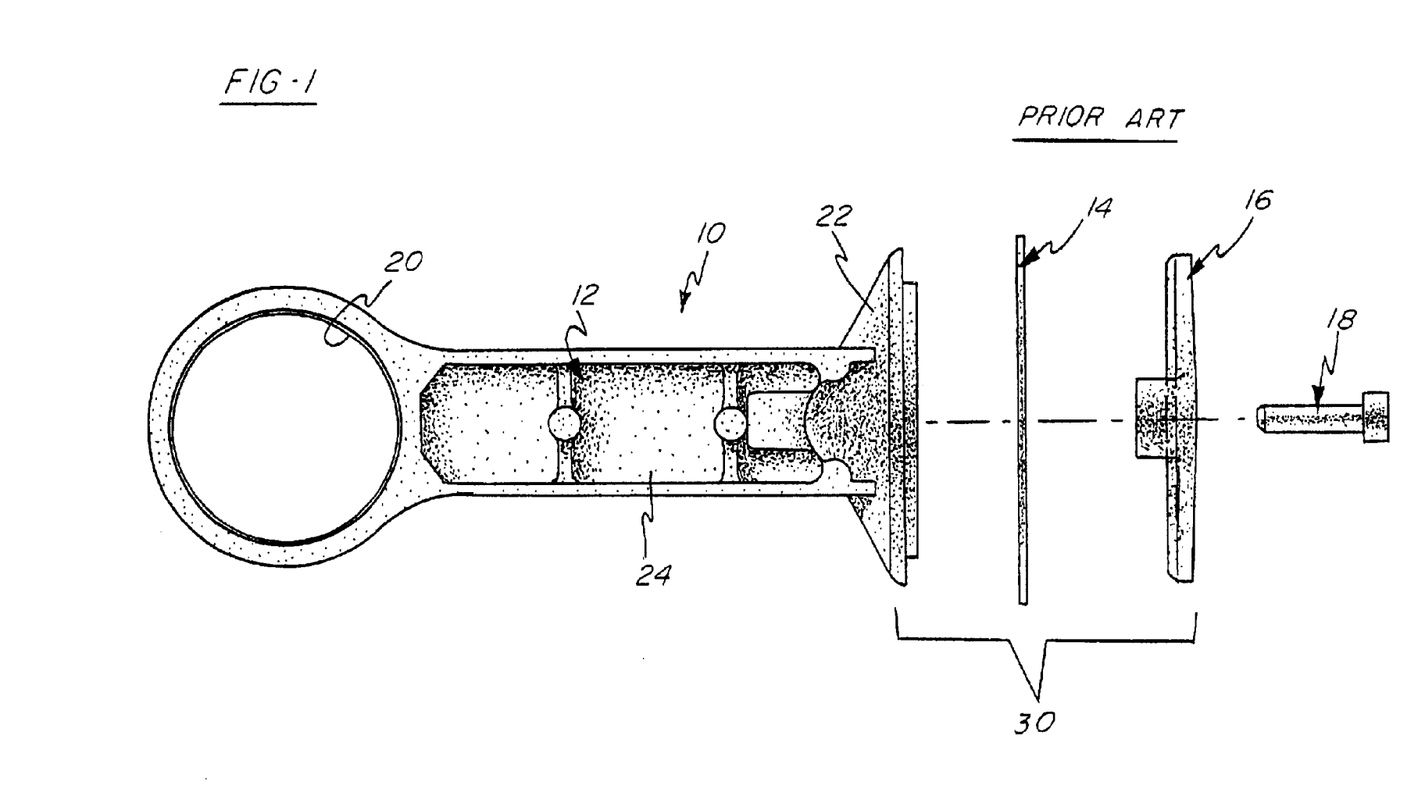
FIG. 1 is an exploded view of a rod/piston assembly in accordance with the prior art.

FIG. 1 shows a prior art rod/piston assembly 10 comprising an aluminum rod die casting 12, a pre-formed PTFE compression ring 14, an aluminum die cast retaining ring 16 and a metal retaining screw or rivet 18. The aluminum rod die casting 12 includes a crank bore 20 and a lower bezel 22 connected by an I-sectioned rod 24. When assembled, the PTFE compression ring 14 is clamped between the retaining ring 16 and the lower bezel 22 to form a piston head 30.

Figure 2:
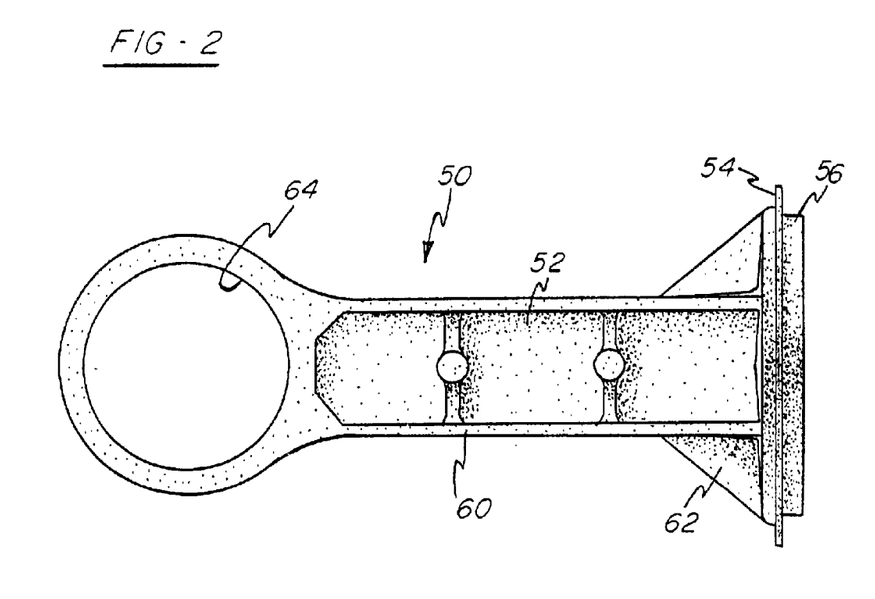
FIG. 2 is a side elevational view of a first embodiment of a rod/piston assembly in accordance with the present invention.

As noted earlier, the prior art rod/piston assembly 10 is constructed from at least four separate pre-formed or pre-cast parts. The overall length of the rod/piston assembly depends on several factors, including cumulative variations in the dimensions of the aluminum rod die casting 12, the PTFE compression ring 14 and the retaining ring 16; the elasticity of the compression ring 14; and the torque or force used in tightening the retaining screw or rivet 18 to clamp the parts together As shown in FIG. 2, a first preferred embodiment of a rod/piston assembly 50 in accordance with the present invention comprises a unitary rod member 52, a compression ring 54 and a polymeric filler or plastic filler ring 56. The unitary rod member 52 includes a connecting rod portion 60 terminating in a lower bezel portion 62. The connecting rod portion 60 is I-sectioned over much of its length, except where it defines a crank bore 64 opposite the lower bezel portion 62.

Figure 3:
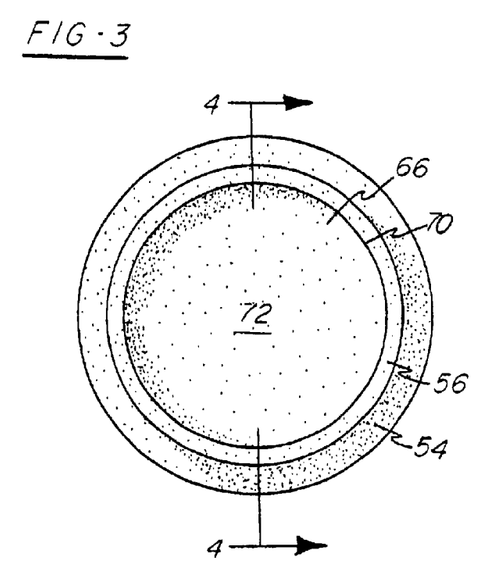
FIG. 3 is a front elevational view of the rod/piston assembly of FIG. 2.
Figure 4:
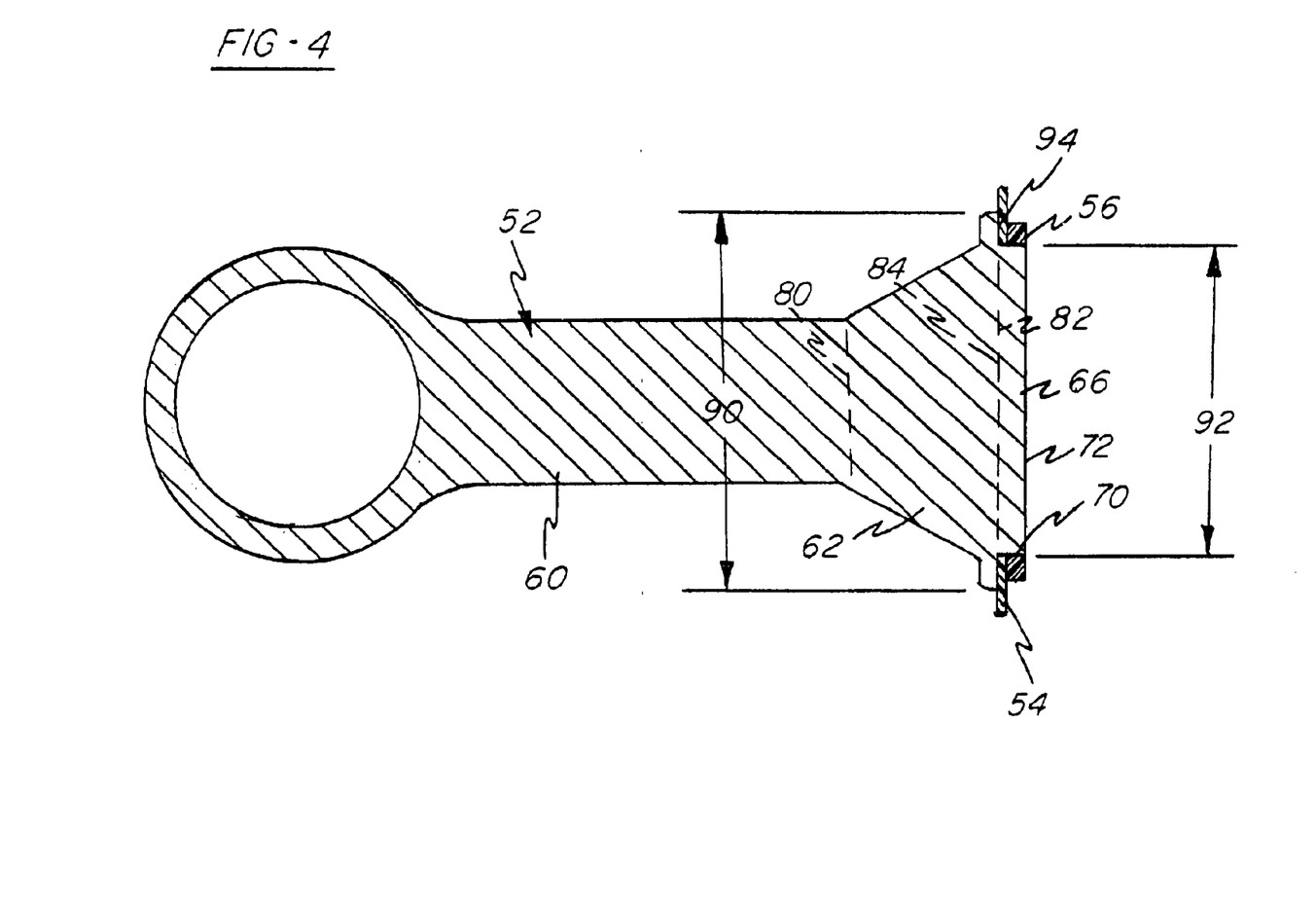
FIG. 4 is a side sectional view of the rod/piston assembly of FIG. 2, taken along the line 4—4 in FIG. 3.

As shown in FIG. 3, the unitary rod member 52 (FIG. 2) further includes a knob portion 66 having a peripheral surface 70 and an outer side 72 defining a free or exposed surface. More specifically, as shown in FIG. 4, the lower bezel portion 62 has a first side 80 and a second side 82. The connecting rod portion 60 terminates along the first side 80 of the lower bezel portion 62. The knob portion 66 extends from the second side 82 of the lower bezel portion 62. The knob portion 66 has an inner side 84 as well as the outer side 72 and the peripheral surface 70. The inner side 84 of the knob portion 66 coincides with the second side 82 of the lower bezel portion 62.

The lower bezel portion 62 defines an outer diameter 90 along its second side 82 and the knob portion 66 defines an outer diameter 92 along its inner side 84. The outer diameter 90 of the lower bezel portion 62 preferably is greater than the outer diameter 92 of the knob portion 66 such that the unitary rod member 52 defines a shoulder or flange 94 where the knob portion 66 extends from the lower bezel portion 62.

Figure 5:
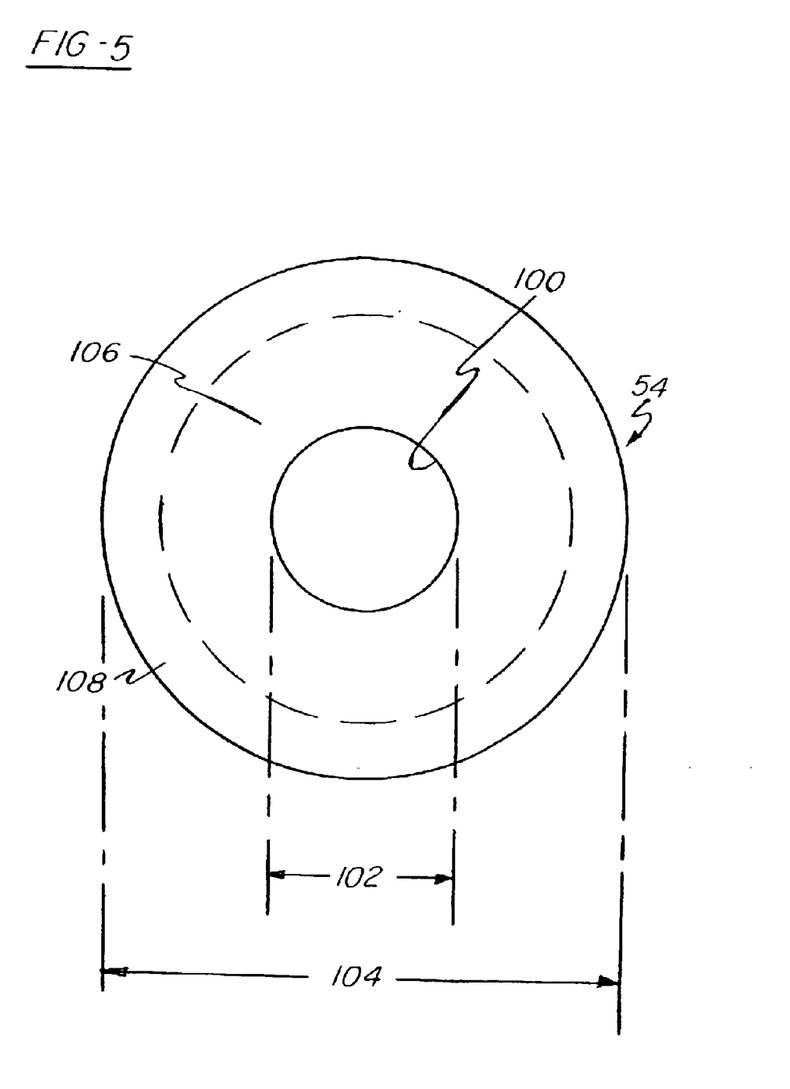
FIG. 5 is a plan view of a compression ring for use in the rod/piston assembly of FIG. 2.

As shown in FIG. 5, the compression ring 54 preferably comprises a PTFE annulus having a hole 100 defining an inner diameter 102 at least as large as the outer diameter 92 (FIG. 4) of the knob portion 66 (FIG. 4). The preferred compression ring 54 also defines an outer diameter 104. Most preferably, the compression ring 54 defines a securing surface 106 and a peripheral portion 108 spaced radially outwardly from the securing surface 106. The compression ring 54 is relatively flat and annular in its natural state as seen in FIGS. 4 and 5, for example. Upon insertion into cylinder 120 and during use, the peripheral portion 108 is bent upwardly to remain in contact with inner surface 122. The peripheral portion 108 is of a sufficient radial length to remain in contact throughout the stroke of the rod/piston assembly 50 and thus expands and contracts to conform to the shape needed to provide the seal with the inner surface 122. For example, as the piston/rod assembly 50 moves, the peripheral portion conforms to fit circular and oval surface configurations depending upon the stroke position.

Figure 6:
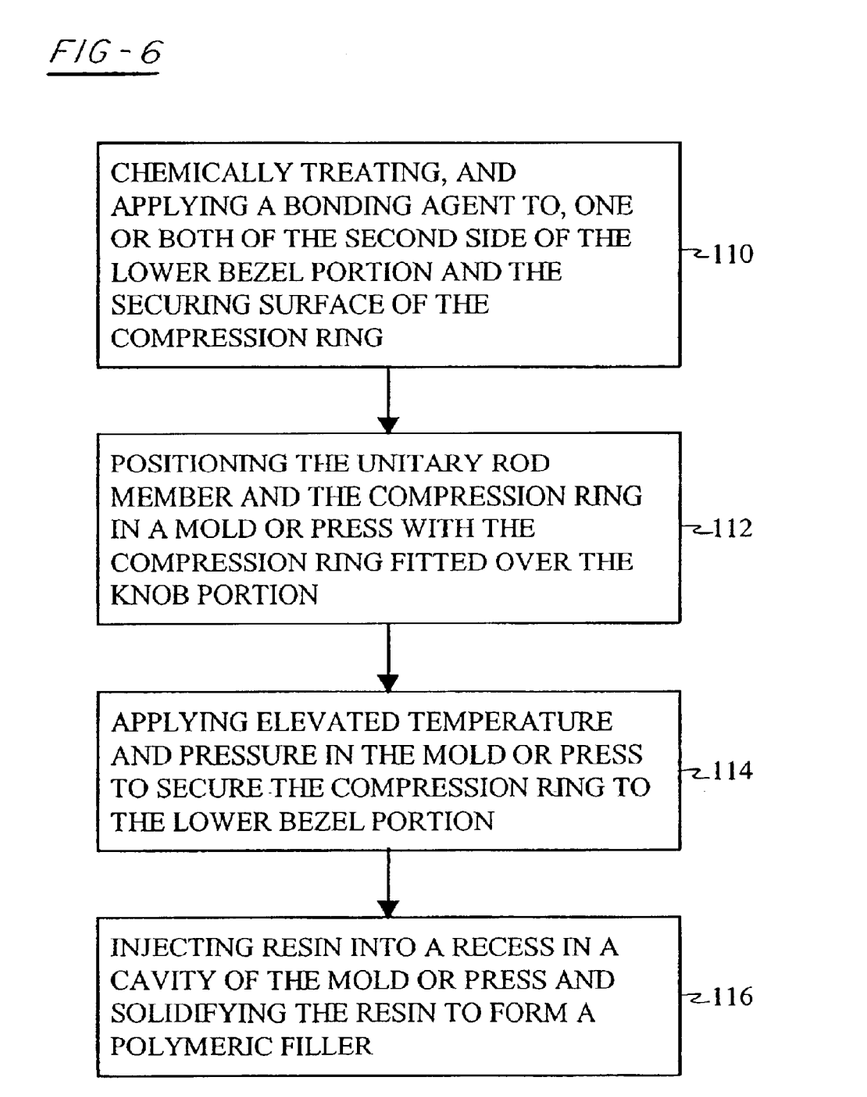
FIG. 6 is a flow chart illustrating a preferred method for manufacturing the rod/piston assembly of FIG. 2.

In accordance with a preferred method of manufacture, the compression ring 54 (FIGS. 4 and 5) is secured to the unitary rod member 52 (FIG. 4) by means of a combination of elevated temperature and pressure in a conventional mold or press (not shown). As illustrated in FIG. 6, a step 110 includes chemically treating, and applying a bonding agent to, at least a section of the second side 82 (FIG. 4) of the lower bezel portion 62 (FIG. 4); at least a section of the securing surface 106 (FIG. 5) of the compression ring 54 (FIGS. 4 and 5), or both, to promote coupling of the compression ring 54 (FIGS. 4 and 5) to the lower bezel portion 62 (FIG. 4). A step 112 includes positioning the unitary rod member 52 (FIG. 4) and the compression ring 54 (FIGS. 4 and 5) in the mold or press (not shown) with the compression ring 54 (FIGS. 4 and 5) fitted over the knob portion 66 (FIG. 4) of the unitary rod member 52 (FIG. 4) such that the securing surface 106 (FIG. 5) of the compression ring 54 (FIGS. 4 and 5) faces the second side 82 (FIG. 4) of the lower bezel portion 62 (FIG. 4). A step 114 includes applying elevated temperature and pressure in the mold or press (not shown) to secure the compression ring 54 (FIGS. 4 and 5) to the lower bezel portion (FIG. 4).

In accordance with one option, the mold (not shown) includes cavity (not shown) shaped to receive the unitary rod member 52 (FIG. 4) and the compression ring 54 (FIGS. 4 and 5). The cavity (not shown) defines a recess (not shown) adjacent the knob portion 66 (FIG. 4) of the unitary rod member (FIG. 4) and the compression ring (FIGS. 4 and 5). The preferred recess (not shown) is configured to form the polymeric filler 56 (FIG. 4). A step 116 of the preferred method of manufacture includes injecting resin into the recess (not shown) and solidifying the resin to form the polymeric filler 56 (FIG. 4).

Figure 7:
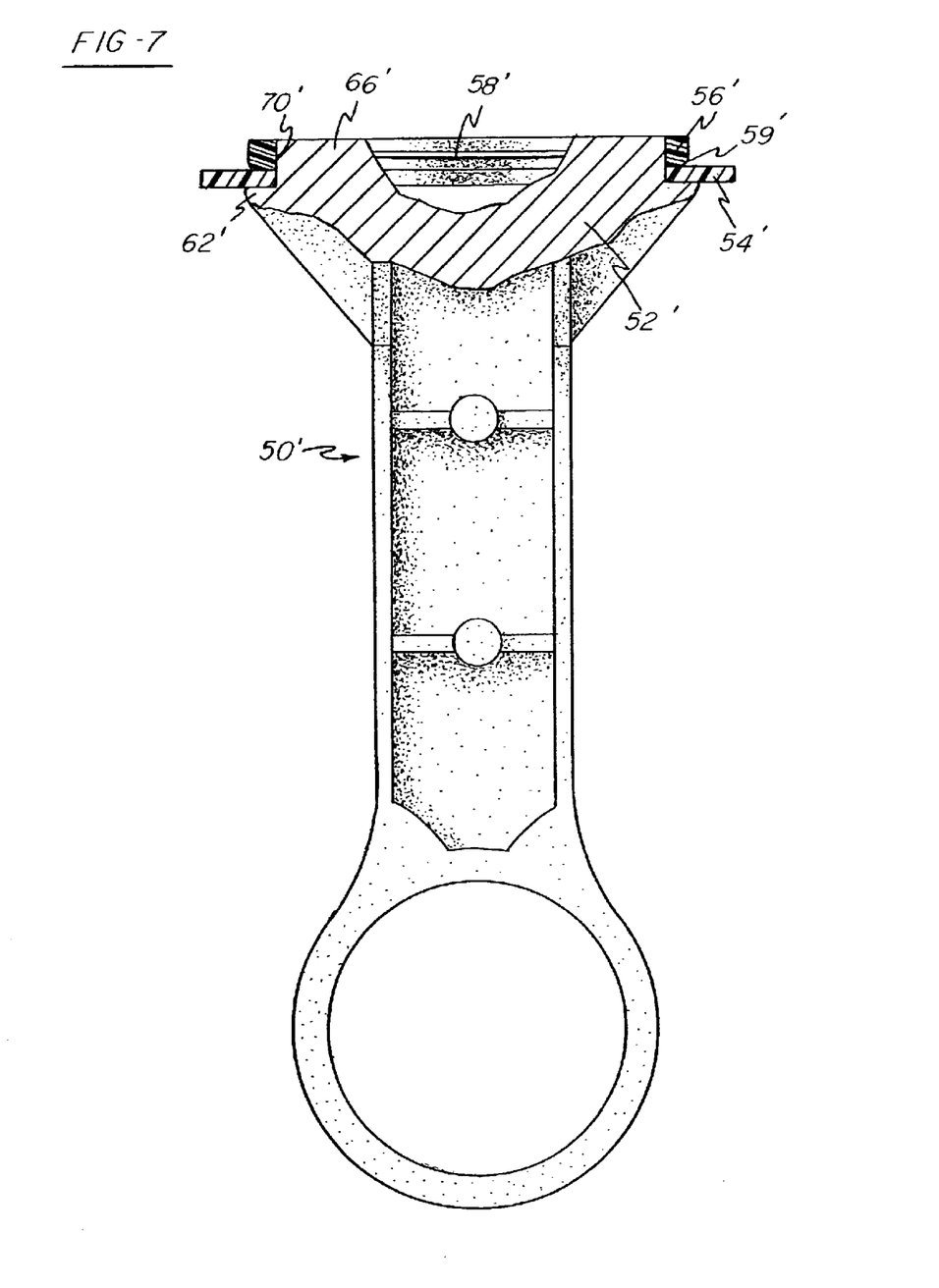
FIG. 7 is a side elevational view of a second embodiment of a rod/piston assembly in accordance with the invention, partially broken away through a lower bezel portion and a knob portion thereof.

In accordance with another option, illustrated in FIG. 7, the assembly 50' includes a polymeric filler or plastic filler ring 56' which is preformed and positioned over a peripheral surface 70' of a knob portion 66' of a unitary rod member 52' before the compression ring 54' is secured to the unitary rod member 52'. As shown in FIG. 7, the preferred plastic filler ring 56' includes an inner bead or lip 58' which cooperates to secure the plastic filler ring 56' to the peripheral surface 70' of the knob portion 66'. The preferred plastic filler ring 56' also includes a fillet 59' adjacent the compression ring 54' for facilitating bending of the compression ring 54'.

Figure 8:
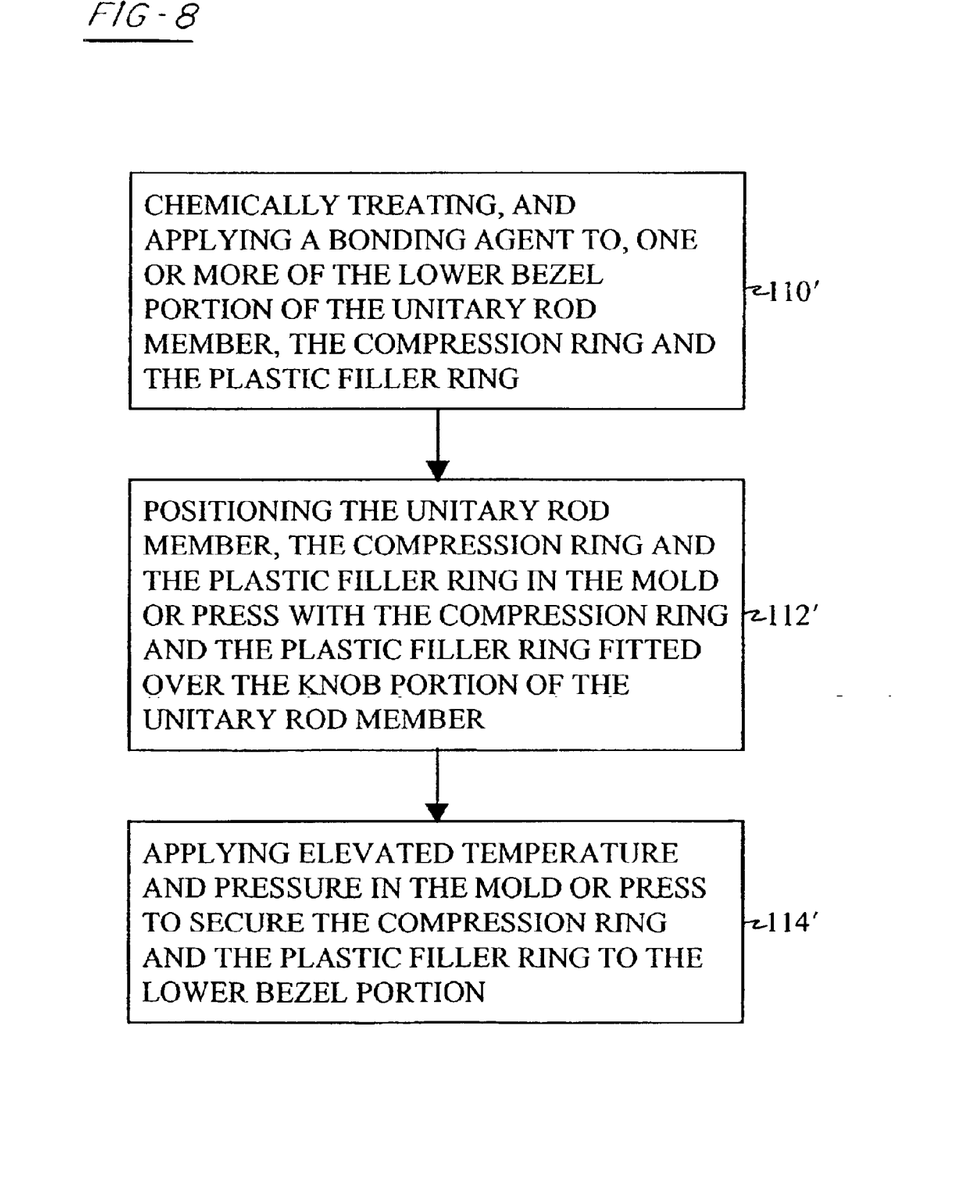
FIG. 8 is a flow chart illustrating a preferred method for manufacturing the rod/piston assembly of FIG. 7.

During assembly, the compression ring 54' and the plastic filler ring 56' are secured to the unitary rod member 52' by means of a combination of elevated temperature and pressure in a mold or press (not shown). The method, as illustrated in FIG. 8, includes the step 110' of chemically treating, and applying a bonding agent to, one or more of a lower bezel portion 62' (FIG. 7) of the unitary rod member 52' (FIG. 7), the compression ring 54' (FIG. 7) and the plastic filler ring 56' (FIG. 7); the step 112' of positioning the unitary rod member 52' (FIG. 7), the compression ring 54' (FIG. 7) and the plastic filler ring 56' (FIG. 7) in the mold or press (not shown) with the compression ring 54' (FIG. 7) fitted over the knob portion 66' (FIG. 7) of the unitary rod member 52' (FIG. 7) and the plastic filler ring 56' (FIG. 7) fitted over the knob portion 66' (FIG. 7) adjacent the compression ring 54' (FIG. 7); and the step 114' of applying elevated temperature and pressure in the mold or press (not shown) to secure the compression ring 54' (FIG. 7) and the plastic filler ring 56' (FIG. 7) to the lower bezel portion 62' (FIG. 7).

Figure 9:
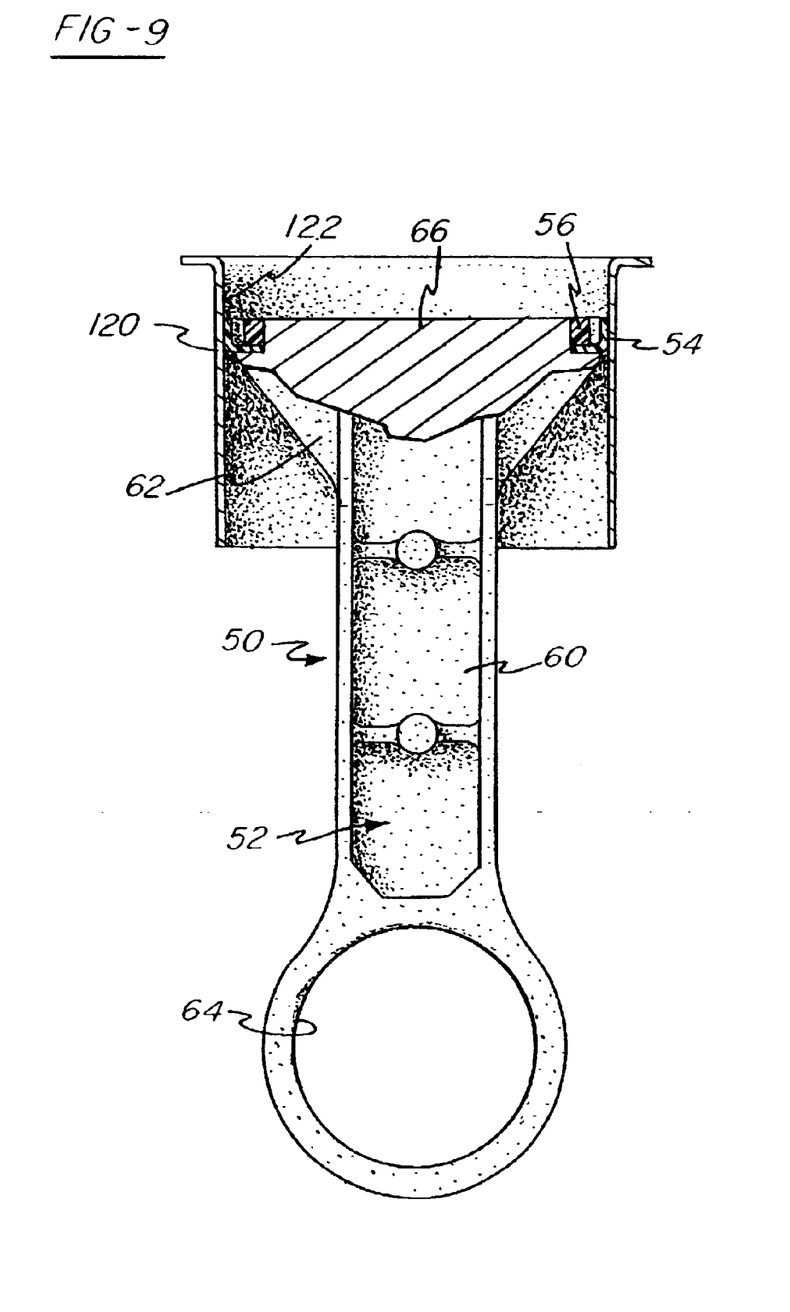

A preferred application for the rod/piston assembly 50 of FIGS. 2–4 (as well as the assembly 50' of FIG. 7) is in an air compressor (not shown). More specifically, as suggested by FIG. 9, the preferred rod/piston assembly 50 is positioned in a cylinder 120 of such compressor (not shown) so that the peripheral portion 108 (FIG. 5) of the compression ring 54 brushes against an inner surface 122 of the cylinder 120. Most preferably, the inner surface 122 defines an inner diameter slightly less than the outer diameter 104 (FIG. 5) of the compression ring 54 and the compression ring 54 has sufficient flexibility such that the peripheral portion 108 (FIG. 5) of the compression ring 54 engages the inner surface 122 over a finite contact surface so as to define a moveable, air tight seal between the rod/piston assembly 50 and the cylinder 120. The preferred polymeric filler 56 serves to constrain the flexure of the peripheral portion 108 (FIG. 5) of the compression ring 54 so as to promote engagement of the peripheral portion 108 (FIG. 5) against the inner surface 122 of the cylinder 120 to form this seal and to control the volume of the cylinder. It is believed that the overall design of the preferred rod/piston assembly 50, including the features highlighted herein, will improve the performance of such air compressors (not shown).

Figure 10:
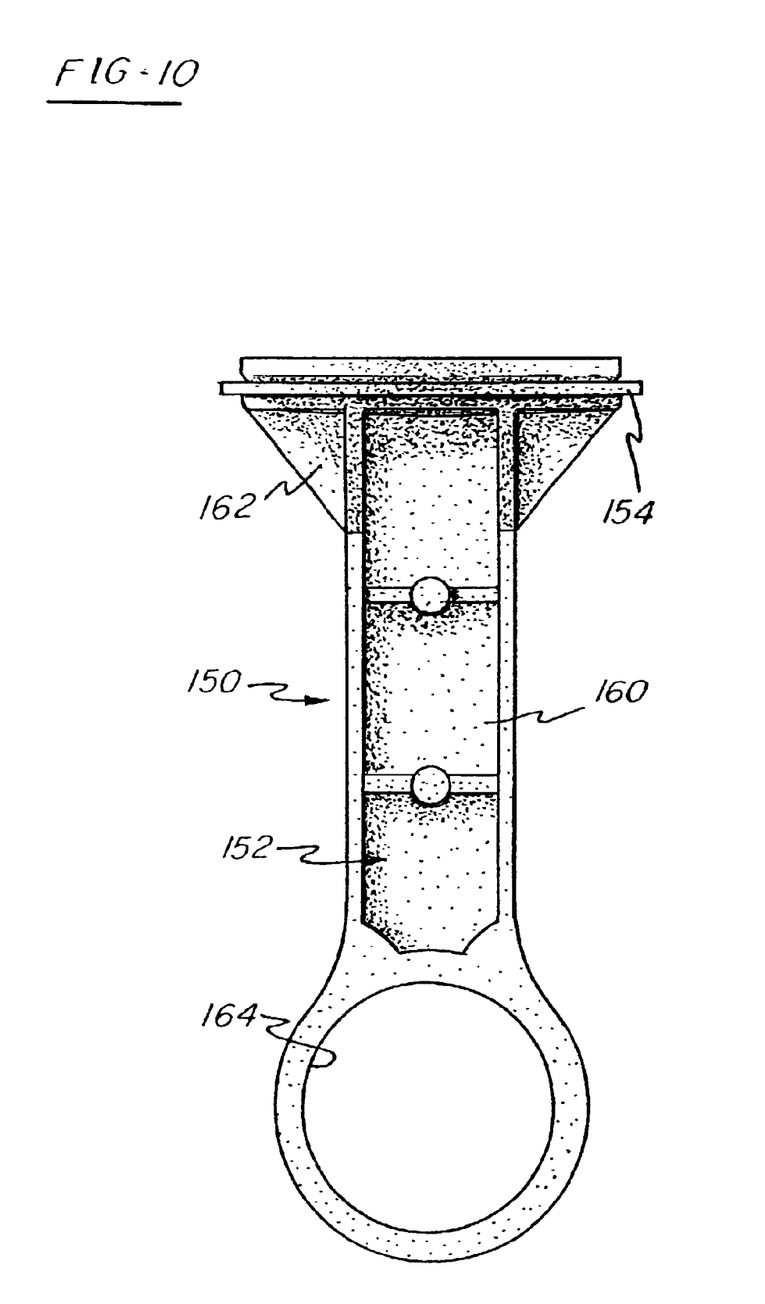
FIG. 10 is a side elevational view of a third embodiment of a rod/piston assembly in accordance with the present invention.
Figure 11:
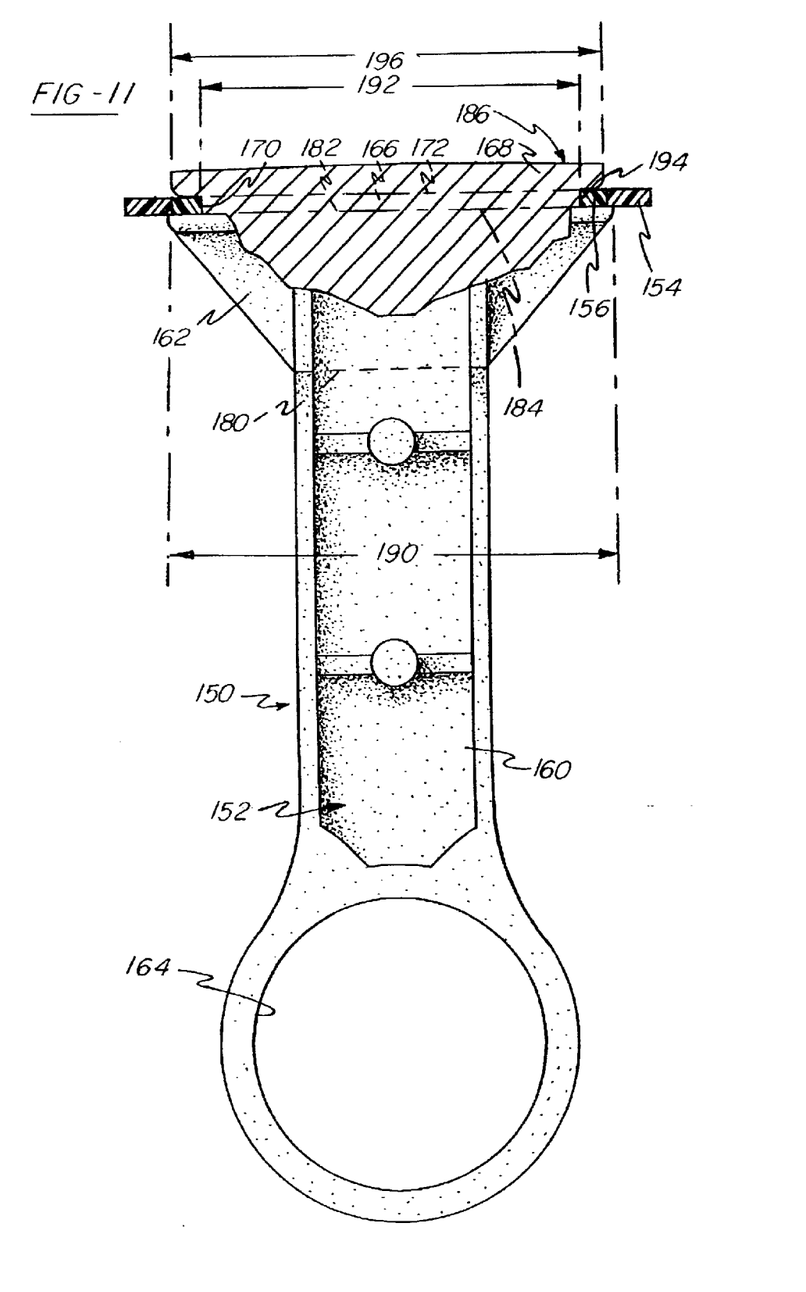
FIG. 11 is a side elevational view of the rod/piston assembly of FIG. 10, partially broken away through lower bezel, knob and upper bezel portions thereof.

As shown in FIG. 10, a third preferred embodiment of a rod/piston assembly 150 in accordance with the present invention comprises a unitary rod member 152 and a compression ring 154. As shown in FIG. 11, a plastic filler ring or collar 156 (FIG. 11) secures the compression ring 154 to the unitary rod member 152.

The unitary rod member 152 includes a connecting rod portion 160 terminating in a lower bezel portion 162. The connecting rod portion 160 defines a crank bore 164. The unitary rod member 152 further includes a knob portion 166 and an upper bezel portion 168. The knob portion 166 has a peripheral surface 170 and an outer side 172.

The preferred geometry of the unitary rod member 152 is arranged as follows. The lower bezel portion 162 has a first side 180 and a second side 182. The connecting rod portion 160 terminates along the first side 180 of the lower bezel portion 162. The knob portion 166 extends from the second side 182 of the lower bezel portion 162. The knob portion has an inner side 184 as well as the outer side 172 and the peripheral surface 170. The inner side 184 of the knob portion 166 coincides with the second side 182 of the lower bezel portion 162. The upper bezel portion 168 extends outwardly from the outer side 172 of the knob portion 166. The upper bezel portion 168 defines a free or exposed surface 186 opposite the knob portion 166.

The lower bezel portion 162 defines an outer diameter 190 along its second side 182 and the knob portion 166 defines an outer diameter 192 along its inner side 184. The outer diameter 190 of the lower bezel portion 162 is greater than the outer diameter 192 of the knob portion 166 such that the unitary rod member 152 defines a peripheral channel 194 aligned with the knob portion 166. The upper bezel portion 168 defines an outer diameter 196 greater than the outer diameter 192 of the knob portion 166 so as to provide an outer bound for the peripheral channel 194.

In accordance with a third preferred method of manufacture, the compression ring 154 is secured to the unitary rod member 152 by means of the polymeric filler 156, which is injection molded in the peripheral channel 194 while the unitary rod member 152 and the compression ring 154 are seated in a mold (not shown). As shown in FIG. 10, a step 200 of the third preferred method of manufacture includes positioning the unitary rod member 152 (FIGS. 10 and 11) and the compression ring 154 (FIGS. 10 and 11) in a cavity (not shown) of the mold (not shown) with the compression ring 154 (FIGS. 10 and 11) fitted over the knob portion 166 (FIG. 11) of the unitary rod member 152 (FIGS. 10 and 11). The preferred compression ring 154 (FIGS. 10 and 11) is a PTFE annulus having a configuration similar to that of the compression ring 54 (FIG. 5). Most preferably, the compression ring 154 (FIGS. 10 and 11) has a hole (not shown) defining an inner diameter (not shown) at least as great as the outer diameter 196 (FIG. 11) of the upper bezel portion 168 (FIG. 11) so as to permit the compression ring 154 (FIGS. 10 and 11) to slip easily over the upper bezel portion 168 (FIG. 11) into position adjacent the peripheral channel 194 (FIG. 11).

Figure 12:
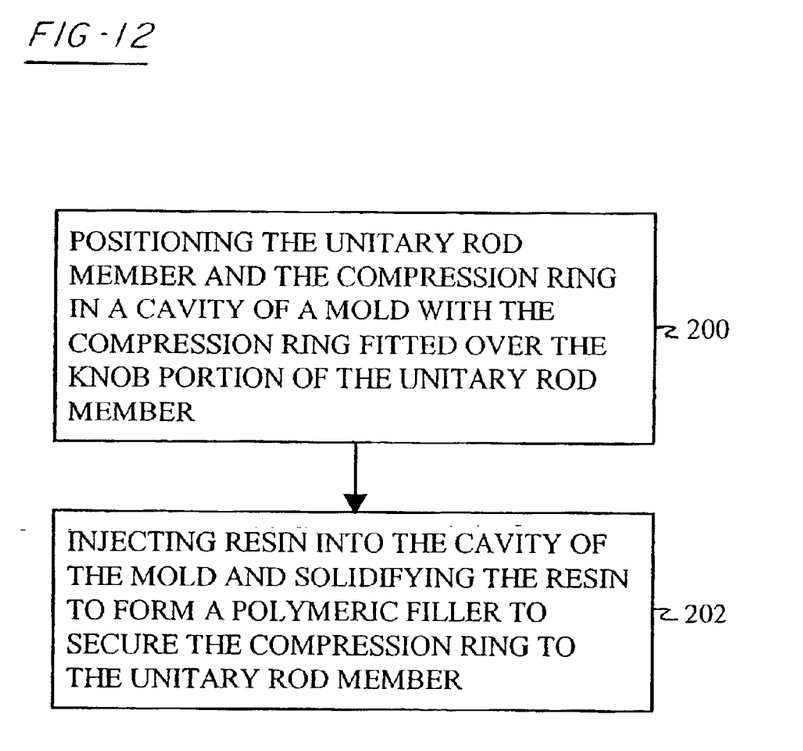
FIG. 12 is a flow chart illustrating a preferred method for manufacturing the rod/piston assembly of FIG. 10.

As shown in FIG. 12, a step 202 of the preferred method of manufacture includes injecting resin (not shown) into the cavity (not shown) of the mold (not shown). The resin (not shown) is solidified to form the polymeric filler 156 (FIG. 11) to secure the compression ring 154 (FIGS. 10 and 11) onto the unitary rod member 152 (FIGS. 10 and 11).

From the foregoing description, it will be apparent that the preferred rod/piston assemblies 50 (FIGS. 2–4), 50' (FIG. 7), 150 (FIGS. 10 and 11), and the preferred methods of manufacture (FIGS. 6, 8 and 12), provide a number of advantages over the prior art. The preferred methods use relatively small numbers of pre-formed or pre-cast parts, namely, just the unitary rod assemblies 52 (FIG. 4), 52' (FIG. 7), 152 (FIG. 11); the compression rings 54 (FIGS. 4 and 5), 54' (FIG. 7); 154 (FIG. 11) and, optionally, preformed plastic filler rings 56' (FIG. 7), although it is within the scope of the invention to include additional pre-formed or pre-cast parts for purposes apparent to those of ordinary skill in the art. The preferred methods (FIGS. 6, 8 and 12) themselves are relatively simple, although it is again within the scope of the invention to include additional method steps for various purposes apparent to those of ordinary skill. In particular, since the compression rings 54 (FIGS. 4 and 5), 54' (FIG. 7), 154 (FIG. 11) are pre-formed, they can be cast or sintered and then processed before they are secured to the unitary rod members 52 (FIG. 4), 52' (FIG. 7), 152 (FIG. 11).

Preferably, the unitary rod members 52 (FIG. 4), 52' (FIG. 7),152 (FIG. 11) are each formed from a single integral die casting of a metal such as aluminum or an aluminum alloy. The preferred compression rings 54 (FIGS. 4 and 5), 54' (FIG. 7), 154 (FIG. 11) are formed from PTFE annuli having sufficient flexibility to form temporary seals against the inner surfaces 122 (FIG. 9) of cylinders 120 (FIG. 9) in which the rod/piston assemblies 50 (FIGS. 2–4), 50' (FIG. 7), 150 (FIGS. 10 and 11) are placed. Preferably, the polymeric fillers 56 (FIG. 4), 56' (FIG. 7), 156 (FIG. 11) are formed from castable resins capable of forming polymers resistant to conditions which the rod/piston assemblies 50 (FIGS. 2–4), 50' (FIG. 7), 150 (FIGS. 10 and 11) are likely to encounter during use. The selection of such materials, and suitable methods for forming or casting of the materials to form the aforementioned parts, is within the ordinary skill in the art.

It will be apparent from FIGS. 4, 7 and 11 that the overall lengths of the preferred assemblies 50 (FIGS. 2–4), 50' (FIG. 7), 150 (FIGS. 10 and 11) depend solely on the lengths of the unitary rod members 52 (FIG. 4), 52' (FIG. 7), 152 (FIG. 11). This implies that, where the unitary rod members 52 (FIG. 4), 52' (FIG. 7), 152 (FIG. 11) are formed from integral die castings, the repeatability of the overall lengths of the assemblies 50 (FIGS. 2–4), 50' (FIG. 7), 150 (FIGS. 10 and 11) will depend primarily on the care with which the castings are prepared. As such, the preferred assemblies 50 (FIGS. 2–4), 50' (FIG. 7), 150 (FIGS. 10 and 11) will have improved dimensional repeatability. In addition, it is believed that the preferred unitary rod members 52 (FIG. 4), 52' (FIG. 7), 152 (FIG. 11) can be shaped in relatively simple dies (not shown), such that a relatively large number of die cavities (not shown) may be formed in a single die (not shown). This will serve to further reduce the cost of manufacture.

From the foregoing description, those skilled in the art will appreciate that the present invention is directed toward improved rod/piston assemblies 50 (FIGS. 2–4), 50' (FIG. 7), 150 (FIGS. 10 and 11) having relatively few pre-formed or pre-cast parts and to improved methods (FIGS. 6, 8 and 11) for manufacturing such assemblies 50 (FIGS. 2–4), 50' (FIG. 7), 150 (FIGS. 10 and 11) requiring relatively few manufacturing steps. While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A rod/piston assembly comprising: a unitary rod member including a lower bezel portion having a lower bezel portion outer diameter, a connecting rod portion and a knob portion having a knob portion outer diameter less than said lower bezel portion outer diameter; said lower bezel portion defining opposed first and second sides such that said connecting rod portion terminates in said first side of said lower bezel portion and said knob portion extends from said second side of said lower bezel portion; said knob portion defining a free surface opposite said second side of said lower bezel portion; and a relatively flat and annular compression ring defining a hole receiving said knob portion and an annular securing surface portion facing said second side of said lower bezel portion, said compression ring being secured to said unitary rod member along said securing surface, and having an unsecured annular surface portion extending radially outward from said annular securing surface.

2. The rod/piston assembly as recited in claim 1 wherein said unitary rod member consists of a single metal casting.

3. The rod/piston assembly as recited in claim 1 wherein said compression ring comprises polytetrafluoroethylene.

4. The rod/piston assembly as recited in claim 1 wherein said compression ring defines an outer diameter greater than said outer diameter of said lower bezel portion.

5. The rod/piston assembly as recited in claim 1 further comprising a polymeric filler, said knob portion defining a peripheral surface and said polymeric filler engaging said peripheral surface to constrain flexure of said compression ring.

6. The rod/piston assembly as recited in claim 1 further comprising a polymeric filler, said knob portion defining a peripheral surface and said polymeric filler engaging said peripheral surface to constrain flexure of said compression ring, said polymeric filler defining an inner bead cooperating with said peripheral surface to secure said polymeric filler to said knob portion.

7. The rod/piston assembly as recited in claim 1 wherein said unitary rod member is metal, said compression ring comprises polytetrafluoroethylene, and said compression ring defines an outer diameter greater than said outer diameter of said lower bezel portion.

8. The rod/piston assembly as recited in claim 7 further comprising a polymeric filler, said knob portion defining a peripheral surface and said polymeric filler engaging said peripheral surface to constrain flexure of said compression ring.

9. The rod/piston assembly as recited in claim 7 further comprising a polymeric filler, said knob portion defining a peripheral surface and said polymeric filler engaging said peripheral surface to constrain flexure of said compression ring, said polymeric filler defining an inner bead cooperating with said peripheral surface to secure said polymeric filler to said knob portion.

10. A rod/piston assembly comprising: a unitary rod member including a lower bezel portion having a lower bezel portion outer diameter, a connecting rod portion and a knob portion having a knob portion outer diameter less than said lower bezel portion outer diameter; said lower bezel portion defining opposed first and second sides such that said connecting rod portion terminates in said first side of said lower bezel portion and said knob portion extends from said second side of said lower bezel portion; said knob portion defining a free surface opposite said second side of said lower bezel portion; and a compression ring defining a hole receiving said knob portion and a securing surface facing said second side of said lower bezel portion, said compression ring being secured to said unitary rod member along said securing surface, and a polymeric filler, said knob portion defining a peripheral surface and said polymeric filler engaging said peripheral surface to constrain flexure of said compression ring.

11. A rod/piston assembly comprising: a unitary rod member including a lower bezel portion having a lower bezel portion outer diameter, a connecting rod portion and a knob portion having a knob portion outer diameter less than said lower bezel portion outer diameter; said lower bezel portion defining opposed first and second sides such that said connecting rod portion terminates in said first side of said lower bezel portion and said knob portion extends from said second side of said lower bezel portion; said knob portion defining a free surface opposite said second side of said bezel portion; and a compression ring defining a hole receiving said knob portion and a securing surface facing said second side of said lower bezel portion, said compression ring being secured to said unitary rod member along said securing surface, and a polymeric filler, said knob portion defining a peripheral surface and said polymeric filler engaging said peripheral surface to constrain flexure of said compression ring, said polymeric filler defining an inner bead cooperating with said peripheral surface to secure said polymeric filler to said knob portion.

12. A rod/piston assembly comprising: a unitary rod member including a lower bezel portion having a lower bezel portion outer diameter, a connecting rod portion and a knob portion having a knob portion outer diameter less than said lower bezel portion outer diameter; said lower bezel portion defining opposed first and second sides such that said connecting rod portion terminates in said first side of said lower bezel portion and said knob portion extends from said second side of said lower bezel portion; said knob portion defining a free surface opposite said second side of said lower bezel portion; and a compression ring defining a hole receiving said knob portion and a securing surface facing said second side of said lower bezel portion, said compression ring being secured to said unitary rod member along said securing surface, wherein said unitary rod member is metal, said compression ring comprises polytetrafluoroethylene, and said compression ring defines an outer diameter greater than said outer diameter of said lower bezel portion, and a polymeric filler, said knob portion defining a peripheral surface and said polymeric filler engaging said peripheral surface to constrain flexure of said compression ring.

13. A rod/piston assembly comprising: a unitary rod member including a lower bezel portion having a lower bezel portion outer diameter, a connecting rod portion and a knob portion having a knob portion outer diameter less than said lower bezel portion outer diameter; said lower bezel portion defining opposed first and second sides such that said connecting rod portion terminates in said first side of said lower bezel portion and said knob portion extends from said second side of said lower bezel portion; said knob portion defining a free surface opposite said second side of said lower bezel portion; and a compression ring defining a hole receiving said knob portion and a securing surface facing said second side of said lower bezel portion, said compression ring being secured to said unitary rod member along said securing surface, wherein said unitary rod member is metal, said compression ring comprises polytetrafluoroethylene, and said compression ring defines an outer diameter greater than said outer diameter of said lower bezel portion, and a polymeric filler, said knob portion defining a peripheral surface and said polymeric filler engaging said peripheral surface to constrain flexure of said compression ring, said polymeric filler defining an inner bead cooperating with said peripheral surface to secure said polymeric filler to said knob portion.

* * * * *